United States Patent
Häusl

(10) Patent No.: US 9,969,120 B2
(45) Date of Patent: May 15, 2018

(54) ADJUSTABLE-ANGLE PRESSING OR NIP ROLL

(71) Applicant: BRÜCKNER MASCHINENBAU GMBH & CO. KG, Siegsdorf (DE)

(72) Inventor: Holger Häusl, Teisendorf (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 0 days. days.

(21) Appl. No.: 15/123,037

(22) PCT Filed: Feb. 5, 2015

(86) PCT No.: PCT/EP2015/000227
§ 371 (c)(1),
(2) Date: Sep. 1, 2016

(87) PCT Pub. No.: WO2015/139798
PCT Pub. Date: Sep. 24, 2015

(65) Prior Publication Data
US 2017/0066176 A1    Mar. 9, 2017

(30) Foreign Application Priority Data

Mar. 20, 2014  (DE) ........................ 10 2014 004 020

(51) Int. Cl.
*B29C 43/24*   (2006.01)
*B29C 55/04*   (2006.01)
(Continued)

(52) U.S. Cl.
CPC ............ *B29C 55/04* (2013.01); *B29C 43/245* (2013.01); *B29C 55/06* (2013.01); *B29C 43/24* (2013.01);
(Continued)

(58) Field of Classification Search
CPC ........ B29C 43/24; B29C 43/46; B29C 43/245
See application file for complete search history.

(56) References Cited

U.S. PATENT DOCUMENTS 4,117,054 A * 9/1978 Salo ........................ B21B 13/14
100/168
4,471,690 A * 9/1984 Yamaguchi .............. D21G 1/00
100/162 R (Continued)

FOREIGN PATENT DOCUMENTS

| EP | 0 677 372 | 10/1995 |
|---|---|---|
| EP | 1 516 955 | 3/2005 |
| GB | 428 206 | 4/1935 |

OTHER PUBLICATIONS

International Preliminary Report on Patentability issued in PCT/EP2015/000227 dated Sep. 20, 2016.
(Continued)

*Primary Examiner* — James P Mackey
(74) *Attorney, Agent, or Firm* — Nixon & Vanderhye P.C.

(57) ABSTRACT

An improved adjustable-angle pressing or nip roll is distinguished, inter alia, by the following features: the angle adjusting device comprises a double-armed lever, the moving device is constructed in such a way that, via this, a pivot axis of the double-armed lever can be adjusted relative to the process roll, and the angle adjusting device comprises, for the double-armed lever, a stop which acts at least on one side, in such a way that, in the case of further force loading by the force actuating unit, a pressing force can be generated which acts on the pivot axis of the double-armed lever and via which the pressing or nip roll can be pressure-loaded onto the roll shell of the process roll with the material web being guided through between the two rolls.

21 Claims, 11 Drawing Sheets

(51) Int. Cl.
*B29C 55/06* (2006.01)
*B29C 43/46* (2006.01)
*B29C 63/02* (2006.01)
*B29K 101/12* (2006.01)
*B29L 7/00* (2006.01)

(52) U.S. Cl.
CPC .............. *B29C 43/46* (2013.01); *B29C 63/02* (2013.01); *B29K 2101/12* (2013.01); *B29L 2007/008* (2013.01)

(56) References Cited

U.S. PATENT DOCUMENTS

| | | | | |
|---|---|---|---|---|
| 4,596,523 A * | 6/1986 | Whitehead | ............... | B29C 43/24 425/363 |
| 4,997,358 A * | 3/1991 | Perkins | ................... | B29C 43/24 100/168 |
| 5,537,726 A * | 7/1996 | Rutz | ....................... | B29C 55/06 26/87 |
| 6,045,349 A * | 4/2000 | Ishida | ..................... | B29C 55/18 425/335 |
| 6,210,145 B1 * | 4/2001 | Seide | ..................... | B29C 43/22 425/194 |
| 7,581,940 B2 * | 9/2009 | Hosogane | .............. | A21C 3/028 425/324.1 |
| 2005/0061166 A1 * | 3/2005 | Pav | .......................... | D21G 1/00 100/164 |

OTHER PUBLICATIONS

International Search for PCT/EP2015/000227 dated May 21, 2015, 2 pages.
Written Opinion of the ISA for PCT/EP2015/000227 dated May 21, 2015, 4 pages.

\* cited by examiner

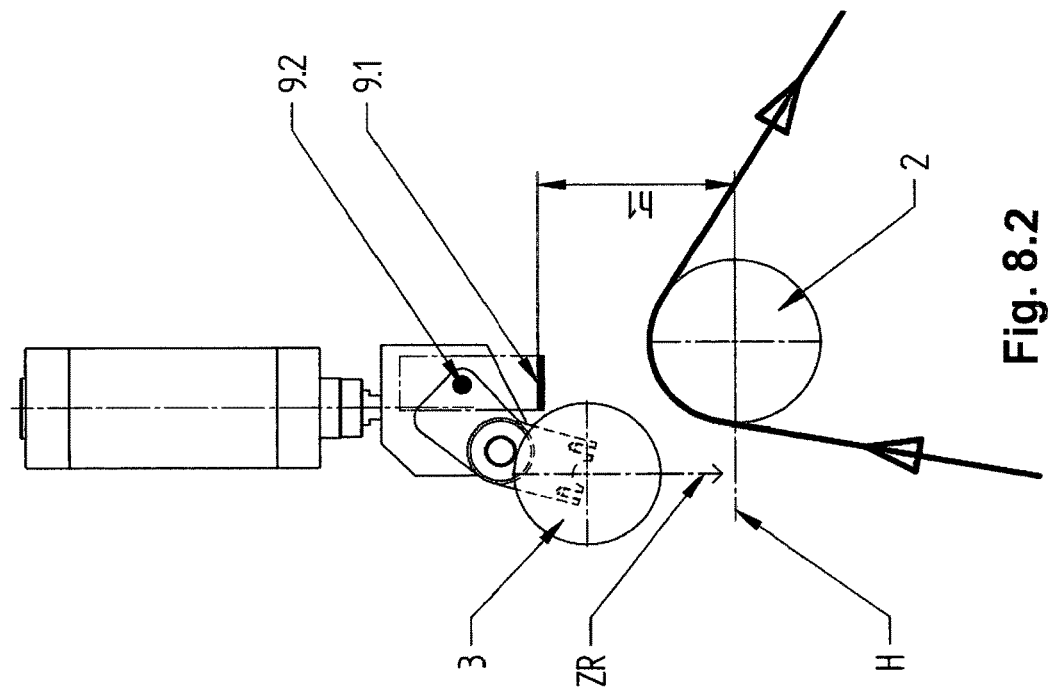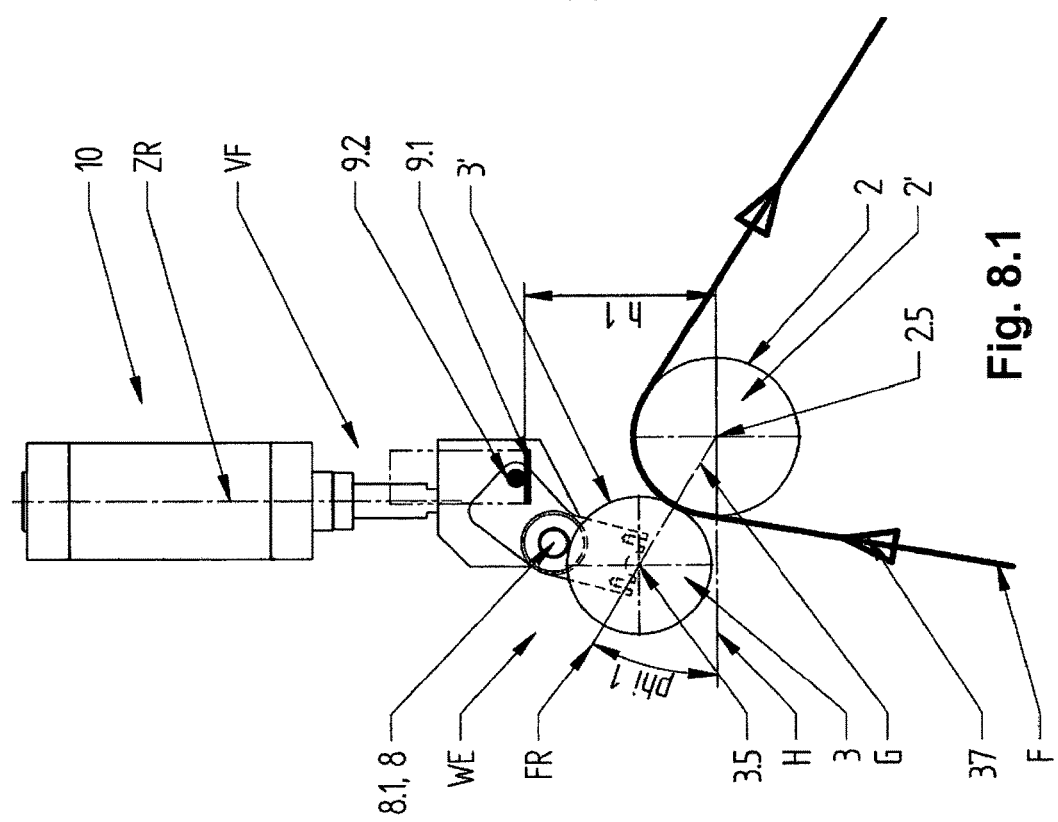

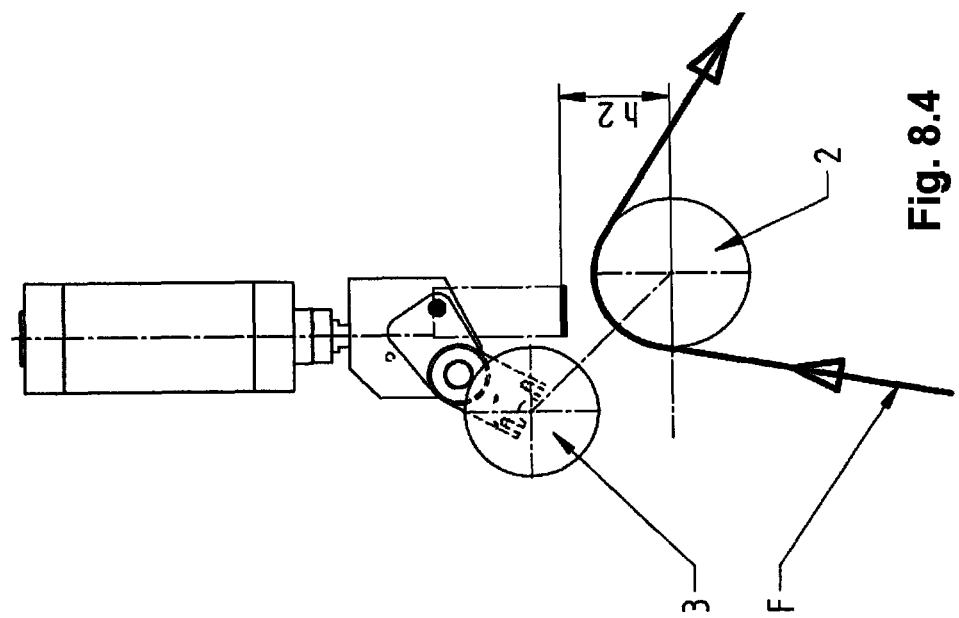
Fig. 8.3
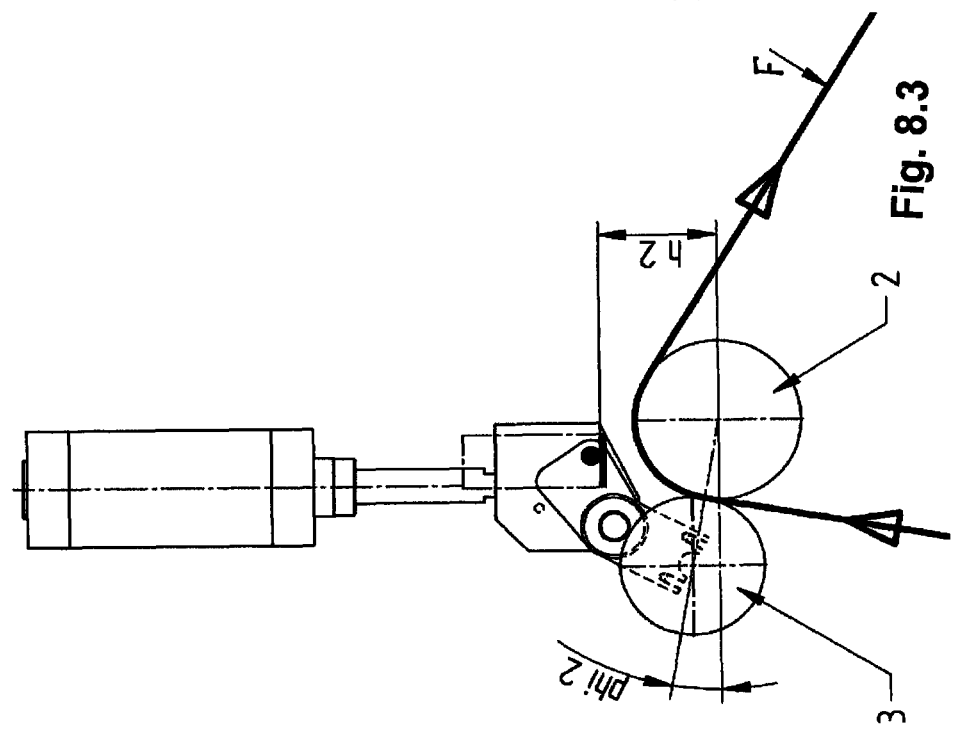
Fig. 8.4

ADJUSTABLE-ANGLE PRESSING OR NIP ROLL

This application is the U.S. national phase of International Application No. PCT/EP2015/000227 filed 5 Feb. 2015 which designated the U.S. and claims priority to DE 10 2014 004 020.8 filed 20 Mar. 2014, the entire contents of each of which are hereby incorporated by reference.

The invention relates to an adjustable-angle pressure or nip roller.

Adjustable-angle pressure or nip rollers of this type can be used in various technical fields. They are of importance for example in film manufacture in longitudinal stretching machines, a withdrawing machine, a coating system and the like. In other words, an adjustable-angle pressure roller of this type can be used anywhere that film-like material webs are advanced over rollers and, in the process, the advanced material web is to be pressed onto the lateral surface of the process roller using what is known as a pressure roller or a nip roller. Therefore, the pressure or nip rollers in question may be of importance not only in plastics material film manufacture for example, but may equally be used in the metal or paper industry. There are no limitations in this regard.

The importance of adjustable-angle pressure rollers of this type will be explained in the following on the basis of a stretching system for film manufacture.

In the manufacture of thermoplastic films, a polymer granulate is initially melted in an extruder, and subsequently supplied to a flat slit die. The melt is cooled on a cooling roller, and is subsequently supplied to a longitudinal stretching unit where the pre-film is heated in a series of preheating rollers at an entry speed v1, and subsequently stretched in the longitudinal direction or machine direction MD in a stretching unit at an exit speed v2>v1. After the longitudinal stretching (in other words stretching in the longitudinal machine direction MDO), the product web is stretched in the lateral direction (in other words in a transverse direction TDO that is transverse to the machine longitudinal direction). An optional coating system may be provided upstream and/or downstream of the lateral stretching (TDO). The product web is withdrawn from the lateral or transverse stretching system (TDO) or the coating system and wound up.

In the aforementioned longitudinal stretching systems (MDO), in the one or more provided coating systems, in the foil withdrawal and on the winder of an overall system of this type, the product web or material web runs over process rollers which extend over the relevant product web width (AB).

One or more process rollers of this type, arranged in succession and having parallel axes, for processing or transporting thermoplastic films are mounted so as to rotate in bearing plates. These rollers cooperate with one or more pressure rollers or nip rollers, which are mounted so as to rotate in a mounting pivotably arranged on either side of the roller, a piston-cylinder unit applying the pressure roller to or lifting it away from the entry-side roller.

A corresponding longitudinal stretching machine, in particular for thermoplastic films, comprising a plurality of stretching rollers that are arranged in succession and having parallel axes and are associated with a rotatably mounted pressure roller, is known for example from EP 0 677 372 B1. In this case, the pressure roller is held pivotably by a pair of supports, the swivel pin of the pair of supports being mounted about a shaft extending parallel to the central axis of the entry and/or exit-side stretching roller. EP 0 677 372 B1 further proposes that the pivotably mounted pair of supports together with the pressure roller be pivotable along a line on an angular rotation range which can be fixed about the central axis of the stretching roller, and be able to be locked in at least a first and a second end position.

In other words, the pressure roller according to EP 0 677 372 B1 is rotatably mounted in such a way that it can be adjusted around a process roller. In this case, the pivot mechanism of the pressure roller, including the feed roller, is rotatably mounted on the axle mounting of the process roller. The pressure roller can be lifted away from the process roller by way of the feed roller.

In operation in practice, however, solutions of this type are found to be inconvenient, since the product web can only be threaded in with extreme difficulty, both manually and by machine. In this case, the tangential starting point is fixed by the product web, and can only be displaced in one direction. In this case, the pressure roller can only be displaced in the direction of the product web face which is already in contact.

Furthermore, EP 1 516 955 A1 discloses various embodiments for a calender which comprises a process roller, referred to therein as an intermediate roller, which cooperates with a plurality of nip rollers.

In this case, in a plurality of embodiments, the nip rollers are mounted approximately centrally on a lever, one end of this adjustment lever being rotatably mounted on the calender support. A cylindrical unloading means is subsequently placed on the other end of the lever, so as to adjust the adjusting forces of the pressure roller, with which said pressure roller rests against the process roller.

In another embodiment of this prior publication, a lever, which is angled in a side view but still has a single arm, is provided, and can likewise be loaded or unloaded at one end by way of a cylindrical unloading means. The opposite pivot point of this lever means is displaceably guided in an arc-shaped recess. The nip roller itself is held rotatably in a central region of this single-arm lever.

By contrast, the object of the present invention is to provide a pressure or nip roller which is adjustable in angle with respect to a process roller, in which the pressure or nip roller can be adjusted as flexibly as possible with respect to the contact points or contact line on a process roller. Threading in the product web or material roll should also be facilitated in the process.

The object may be achieved according to certain embodiments, and advantageous embodiments may also be possible.

Pressure rollers, and indeed nip rollers, are auxiliary means which cooperates with stretching rollers, for example in a longitudinal film-stretching machine, so as to press the film onto or against these rollers. In withdrawing and winding systems, said rollers ensure that a product web can be conveyed out of the stretching machine and wound up. In coating systems, said rollers ensure, inter alia, the planar positioning.

Thus, depending on the arrangement and requirements, these pressure rollers should basically perform the following functions:

a) Inclusion of an air cushion, in other words air bubbles, between the film or the material web in general and the process roller should be prevented.

b) It should be ensured that the material web guided along over a process roller can be pressed against this process roller with correspondingly adequate forces. This is of importance in particular in film manufacture, so as to ensure that this can contribute to increasing the film stretching forces to be transmitted to the film web.

c) Further, retraction of the material web, for example film retraction, should be prevented, preferably in the region of an output-side process roller.

d) By precisely adjusting the application line, microscratches on the film or film coatings can be reduced.

Thus, in all these functions, pressure rollers can be used which generally have a roller length comparable to the axial length of the process roller. In place of these, nip rollers may also be used, which take on a particular position with respect to the process roller in the entry and exit of the product web, and usually are merely of a shorter axial longitudinal extension than the actual process roller, and thus frequently are only positioned, and therefore only effective, in the region of the process roller end portions.

The solution according to the invention is characterised by a combination of various features.

Thus, in all these functions, pressure rollers can be used which generally have a roller length comparable to the axial length of the process roller. In place of these, nip rollers may also be used, which take on a particular position with respect to the process roller in the entry and exit of the product web, and usually are merely of a shorter axial longitudinal extension than the actual process roller, and thus frequently are only positioned, and therefore only effective, in the region of the process roller end portions.

The solution according to the invention is characterised by a combination of various features.

Thus, in the context of the invention, it is provided for the adjustable-angle pressure and/or nip roller to be pivotable about an axis which is arranged so as to be offset from the actual axis of the process roller. In this case, in the context of the invention, the axial line of the adjustment axis of the pressure and/or nip roller is also arranged so as to be radially offset from the actual process roller to such an extent that a sufficient space can be set between the holding means and the adjustment means of the pressure and nip roller, as well as the pressure and/or nip roller itself and the actual process roller. This greatly facilitates threading in the material web to be guided through the system.

In a preferred embodiment, the invention is further characterised in that different stop-limited angular positions for the pressure and/or nip roller can be set, in which the pressure and/or nip roller can then be adjusted to the roller circumference of the process roller (whilst the material web guided therebetween is received in a sandwich-like manner).

Depending on the function to be performed by the pressure or nip roller, said roller should assume a particular position with respect to the process roller at the entry and/or exit of the product web.

If, for example, air inclusions between the process roller and the film are to be prevented, the pressure roller should be placed directly on the tangential entry of the film onto the stretching roller.

The freedom from scratches of product webs which are to be or have been coated can be greatly improved if the position of the application line can be adjusted and thus optimised by means of a defect detection system during continuous operation.

In stretching rollers, the transmissible stretching forces or the winding friction can be increased if the pressure roller acts on the stretching roll as close as possible to the entry of the tangential entry point of the film.

To prevent the film from retracting in the region of the stretching gap at the exit of the longitudinal stretching machine, a pressure roller may act on the stretching roller there too. Without a corresponding pressure roller, depending on the coefficient of friction between the film and the stretching roller, a film retraction occurring during stretching would progress from the edge regions of the roller over the surface thereof towards the centre of the roller.

Progression of the product web in the transverse direction (TDO) can be prevented or minimised for all rollers by a pressure and/or nip roller according to the invention.

On account of the invention, it is possible for the pressing direction of the pressure and/or nip roller not to be the same as the feed direction of this roller.

The position of the pressure roller can be adjusted relative to the process roller, even during operation. This has major advantages, since for some processes it is necessary to optimise the position continuously.

The control mechanism is independent of the mechanism of the process roller.

In addition, in the context of the invention, threading in the product web is facilitated.

In many stretching units, coating systems and withdrawing and/or winder devices, the application direction and contact angle of the product web or material web on the process roller change depending on the respective uses. In this context, the invention has major advantages over conventional solutions, in particular because the application point or the application lines can be flexibly adapted to the running processes and/or manufacturing processes, in particular threading in or introducing the product web or material web in addition also being greatly facilitated.

Thus, by contrast with an embodiment known from the category-defining prior art according to EP 1 516 955 A1, in the context of the invention a very specifically formed, stop-limited positioning and force adjustment means can thus make it possible, using a two-sided or two-armed lever, for the corresponding contact pressures of the nip rollers on the process roller to be introduced both via the pivot point and via the force arm and thus via the stop faces, which limit a pivot movement of the double-arm lever at least in one direction. In this case, in a preferred embodiment of the invention, both the position and the force introduction can be achieved via the pivot point and/or the stop face, which is not possible in the category-defining solution.

In the following, the invention is described in greater detail with reference to the drawings, in which, in detail:

Figure 9:
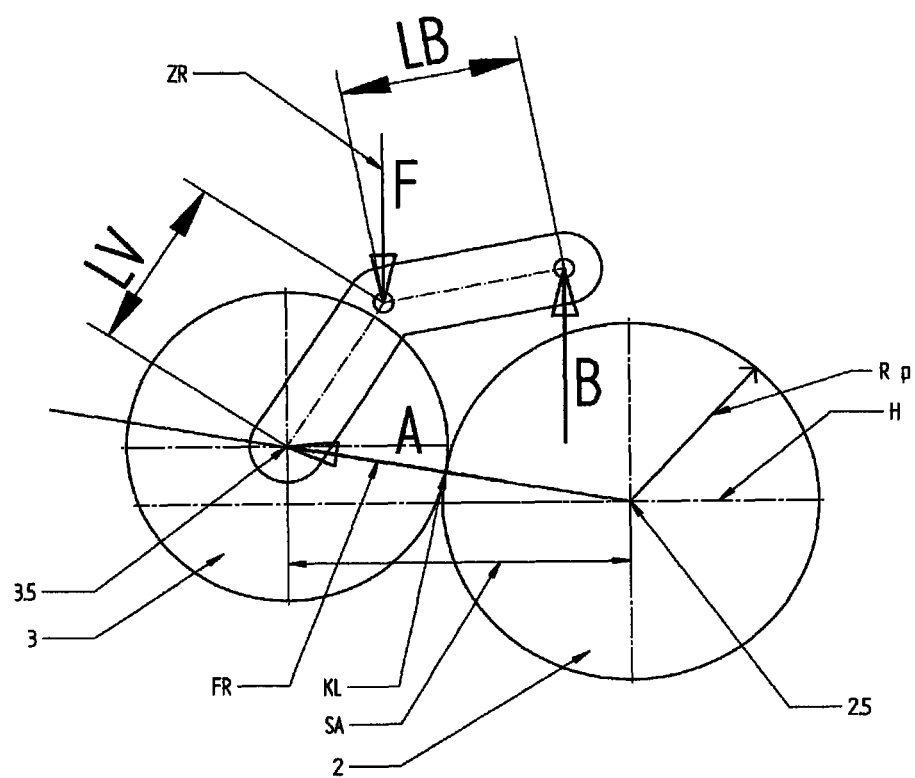
Figure 10:
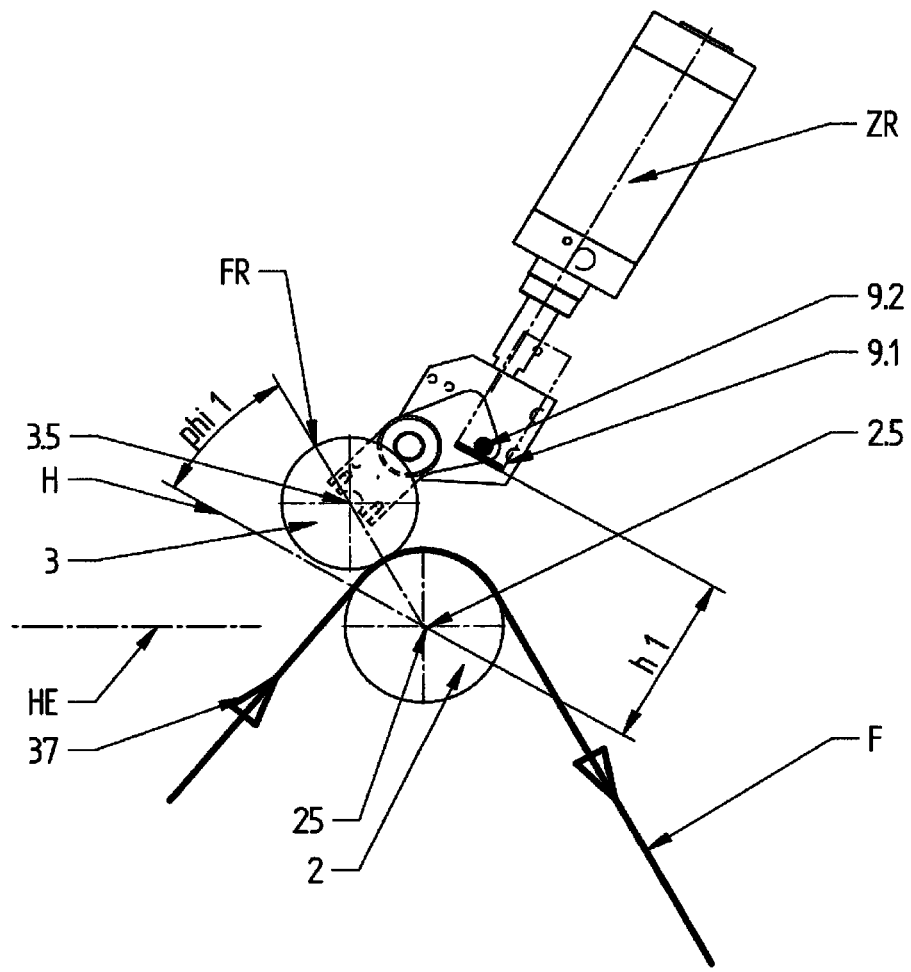

FIGS. 8.1 and 8.2 are axial sections through the process roller and the pressure roller in engagement therewith, including an associated stop-limited adjustment means, during operation and in the raised parked position, respectively, a first stop-limited stop height being pre-set, by which the contact position of the pressure roller on the process roller is predetermined;

FIGS. 8.3 and 8.4 are views comparable to FIGS. 8.1 and 8.2 having a pressure roller which is located in the operating position in FIG. 8.3 and in the raised parked position in FIG. 8.4, but at a stop height adjusted differently from FIGS. 8.1 and 8.2;

FIG. 9 is a schematic side view in parallel with the axes of the pressure roller and the process roller for illustrating the operating principle; and FIG. 10 is a view similar to FIGS. 8.1 and 8.3, but in a positioning orientated pivotably with respect thereto, such as is conventionally provided in a stretching system.

In the accompanying drawings, it can be seen that for example a process roller 2 is rotatably mounted, in the region of the opposite end faces thereof, by means of bearings 2.1 in holding means 1 provided there, for example in the form of respective bearing plates. The holding means 1, which are attached to the opposite end faces of the rollers shown in FIG. 1, in other words the process roller 2 and the pressure and/or nip rollers 3, 4, can be constructed identically, or at least similarly in significant parts. The film F runs over the process roller. The adjustment mechanism 6 for the pressure or nip rollers 3, 4 is screwed to the holding means 1.

The holding means 1 may be configured and fixed differently depending on the application.

The process roller 2 extends over the relevant working width AB of the product web. If nip rollers are used instead of pressure rollers 3, 4, the roller width thereof does not extend over the entire width AB, but instead nip rollers are merely used in the edge regions of the product web, and are accordingly shorter. An adjustment means VE having an associated adjustment mechanism 6 is mirror-symmetrical on the drive and operator site (in other words on the right-hand and left-hand sides of FIG. 1).

The adjustment means VE having the adjustment mechanism 6 comprises adjustment slides 6.2 and linear guides 6.1 by means of which the pressure or nip rollers 3, 4 can be fed to the process roller 2 and subjected to force by a force activation unit 10. In the operating position, the pressure or nip rollers 3, 4 thus exert, via the associated roller surfaces 3' and 4', respectively, thereof, a contact pressure on the roller surfaces 2' of the process roller 2, the material web F on which the corresponding contact pressures act being guided through between the respective surfaces 3', 4' of the pressure or nip roller 3, 4 and the roller surface 2' of the process roller 2. Subsequently, by means of the aforementioned adjustment means VE, the pressure or nip roller 3, 4 can be displaced away from the process roller 2 from this operating position, forming a corresponding distance between the pressure or nip roller 3, 4 on the one hand and the process roller 2 on the other hand. As will be shown in the following, the adjustment means VE provided for this purpose comprises a displacement means VF which, in the context of the invention, is formed as a linearly or translationally adjustable displacement means VF, and in addition an angle adjustment means WE, by way of which different contact positions of the relevant pressure or nip roller 3, 3 in relation to the process roller 2 can be adjusted.

All possibilities from the prior art, such as pneumatic cylinders, hydraulic cylinders, and mechanical and electromechanical variants may be used as a force activation unit 10.

The pressure rollers 3 and 4 are fixed on the adjustment levers 7.1 and 7.2, respectively, so as to be rotatable with respect to the axial centre lines 3.5 and 4.5.

The lever arms of the two adjustment levers 7.1, 7.2 are rotatably mounted on pivot axles 8.1, 8.2. The pivot axles are fixed to provided adjustment slides 6.2.

In other words, it can thus be seen from the drawings that the angle adjustment means WE comprises a two-armed adjustment lever 7.1, 7.2. This adjustment lever 7.1, 7.2 is in each case held pivotably on the displacement means VF by way of a pivot axle 8.1, 8.2 by way of the angle adjustment means WE, the pivot axle 8.1 being displaceable along the feed direction ZR by means of the displacement means VF.

If the relevant adjustment slide 6.2 moves in the direction of the process roller 2, depending on the adjustment, a stop bolt 9.2 strikes a stop or a stop face 9.1 or the pressure roller 3, 4 touches the process roller 2.

The relevant stop bolt 9.2 is rigidly connected to the pivot lever 7.1 or 7.2. The stop face 9.1 can be displaced automatically or manually via provided actuators 11. All drives from the prior art may be used as actuators 11. Further, a transmission 11.1 may be connected in between.

The stop adjustment system consists of a holding plate 90.1, in which slots 90.2 are provided which act as a guide for the adjustment unit 90.3.

Display units 100.1 provide further guidance of the adjustment units 90.3 and an optical display of the adjustment path, for which purpose a scale 100.2 is provided.

Figure 1:
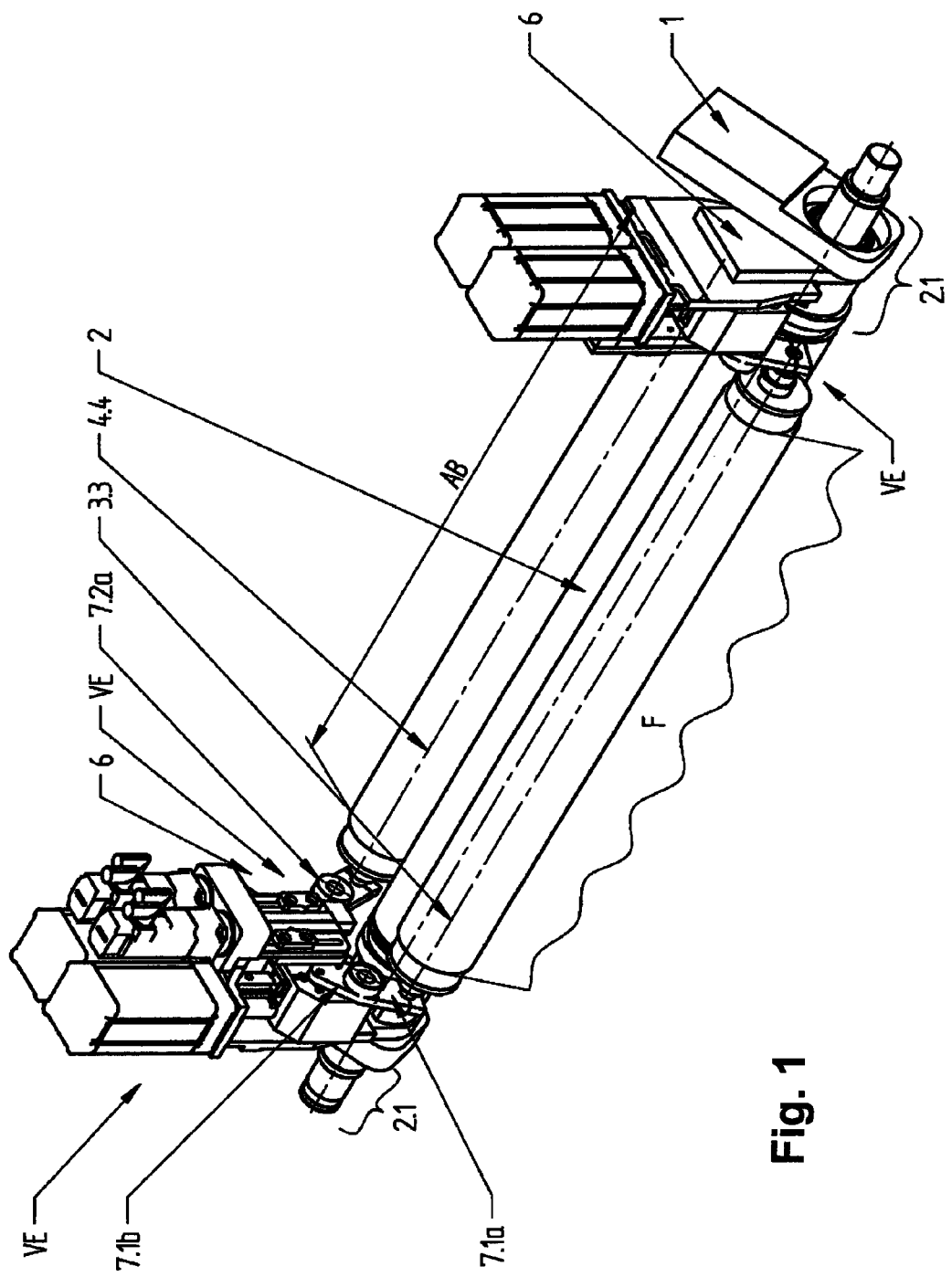
FIG. 1 is a schematic three-dimensional view of a process roller having a pressure roller arranged on the entry and exit sides as a first embodiment according to the invention.
Figure 2:
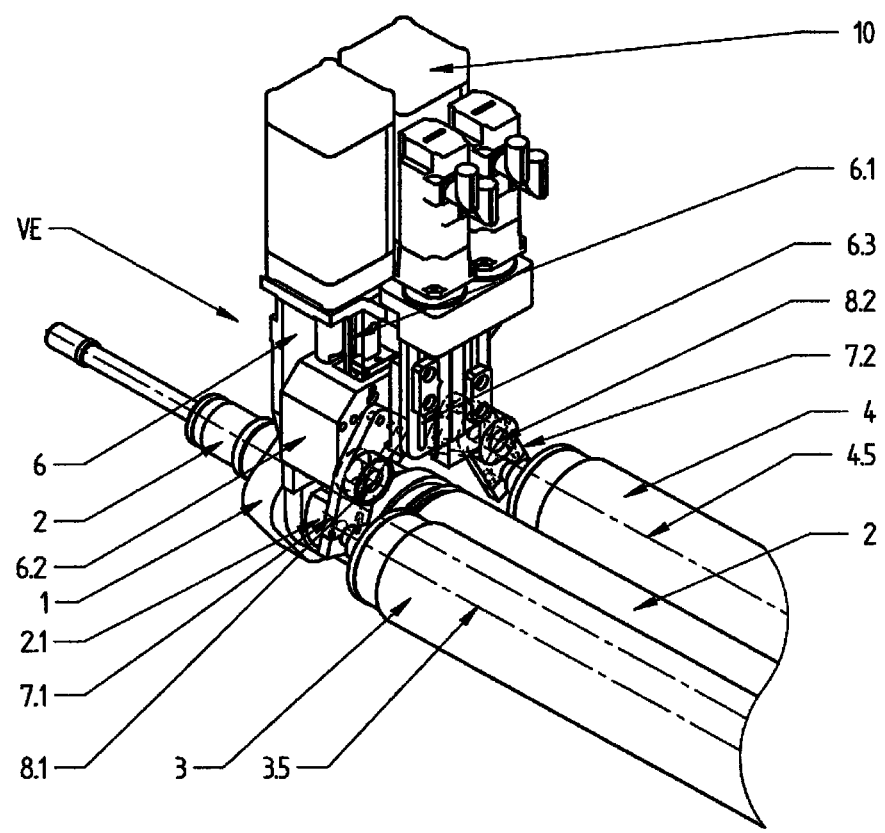
FIG. 2 is an enlarged detail from FIG. 1.

From the drawings, it can further be seen that the two adjustment levers 7.1 and 7.2 for adjusting the pressure roller 3 which is further forward or to the left in FIGS. 1 and 2, and the pressure roller 4 which is further rearward or to the right, respectively, are pivotable about the aforementioned pivot axles 8.1 and 8.2, respectively. In this case, the two adjustment levers 7.1 and 7.2 comprise lever arms 7.1*a*, 7.1*b* and 7.2*a*, 7.2*b*, respectively, that extend in opposite directions or away from one another and are oriented so as to be slightly angled towards one another. The relevant pressure or nip roller 3, 4 is mounted on the associated adjustment lever arm 7.1*a* and 7.2*a*, respectively, which extends slightly downwards in FIGS. 1 and 2. The relevant aforementioned stop or stop bolt 9.2 that is pivotable together with the adjustment lever, is formed on the opposing adjustment lever arm 7.1*b* and 7.2*b*, respectively, which extends slightly upwards. The effective length of the adjustment lever arm 7.1*a* or 7.2*a* carrying the relevant pressure or nip roller (from the pivot axis 8.1 and 8.2, respectively, to the associated axial centre line 3.5 and 4.5, respectively, of the nip roller 3, 4, respectively) is denoted LV in FIG. 2, the effective length between the respective pivot axles 8.1 and 8.2 and the position of the stop bolt 9.2 on the associated second adjustment lever arm 7.1*b* and 7.2*b*, respectively, is denoted by the value LB in FIG. 2.

The lever ratios LV and LB (in other words the lever ratios relating to the lever arms 7.1*a* to 71.*b* and 7.2*a* to 7.2*b*, respectively) determine both the position and the contact pressures for adjustable contact pressure of the force mechanism 10. Depending on the height of the stop face 9.1, both the position and the force introduction direction of the pressure roller 3, 4 with respect to the process roller 2 are thus determined.

By changing the position of the stop face, it is thus possible to adjust the position of the pressure or nip roller 3, 4, which is adjusted differently thereby, with respect to the associated process roller 2, even during operation with a continuously advancing material web F. From FIGS. 8.1 to 8.4, described in greater detail in the following, it can thus be seen how the contact line between the relevant pressure or nip roller 3, 4 and the process roller 2 can be changed by way of different adjustments of the contact face or the stop 9.1. As a result, the position of the contact line, along which a corresponding pressure is exerted on the roller surface 2' of the process roller 2 via the roller surface 3', 4' of the pressure or nip roller 3, 4, is changed.

In addition, the contact pressure can be changed by way of the described construction.

Figure 3:
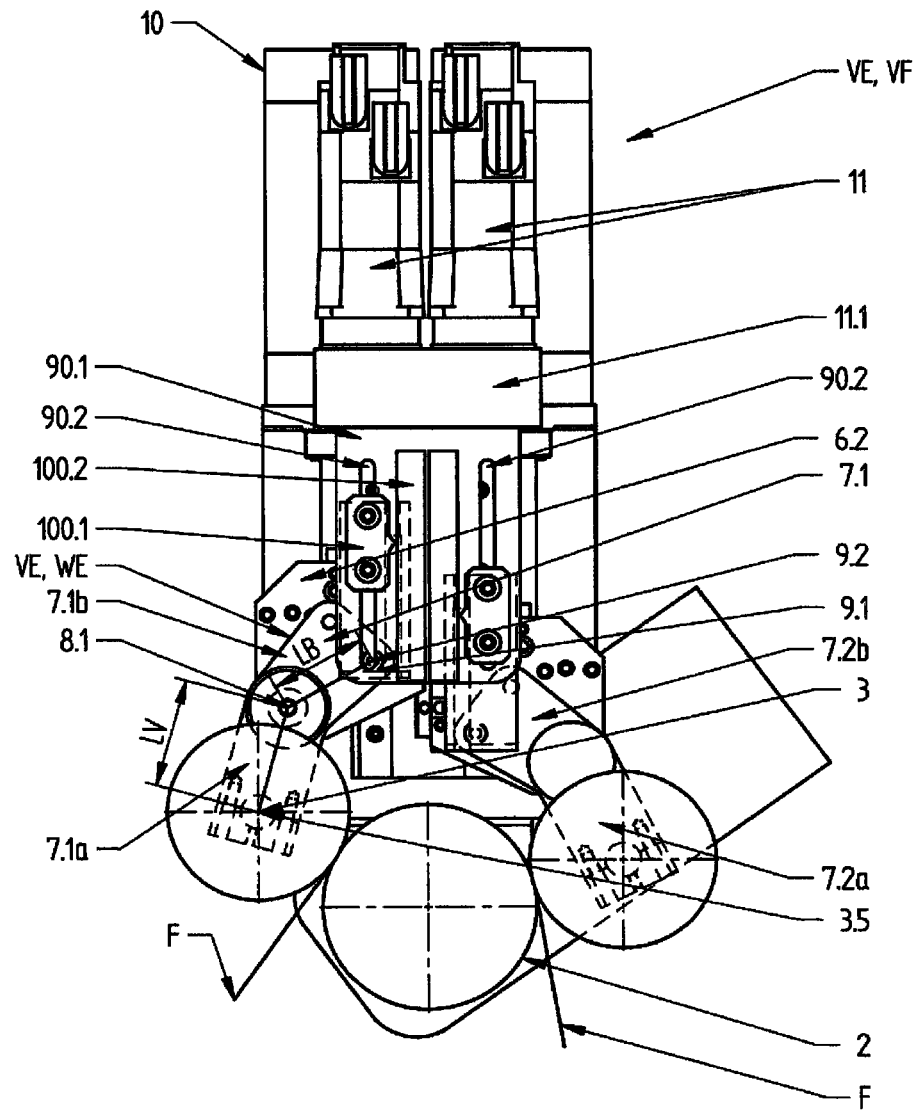
FIG. 3 is a vertical axial section through the arrangement of FIG. 1 or 2, giving a plan view of the adjustment means positioned on the left-hand side in FIGS. 1 and 2.

As can be seen from the side view according to FIG. 3, the pressing device can be mounted both in the entry direction and in the exit direction of the film, or else only in one direction. The adjustments of the tangential starting line can be adapted accordingly.

Figure 4:
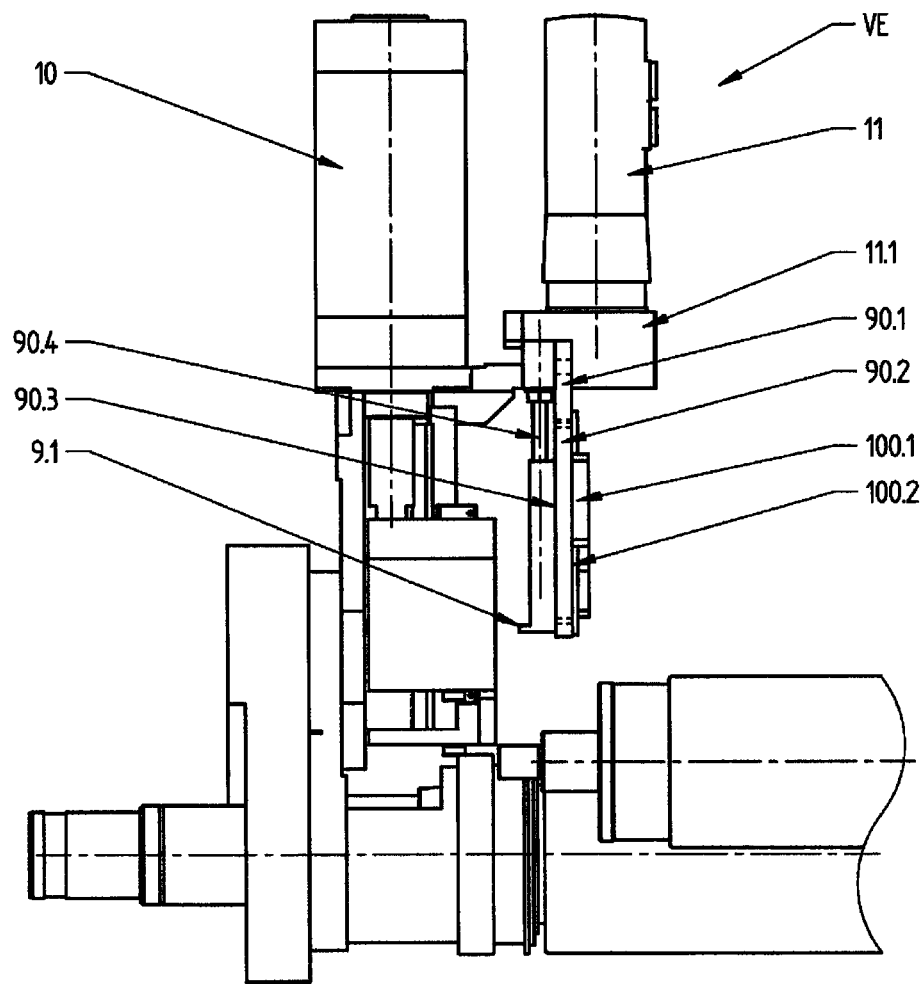
FIG. 4 is a detail of the adjustment means, in a side view rotated through 90° from FIG. 3.

The adjustment unit 90.3 for the stop face 9.1 is adjusted by means of a spindle 90.4 using the actuator 11 and the optional transmission 11.1 (FIG. 4).

Figure 5:
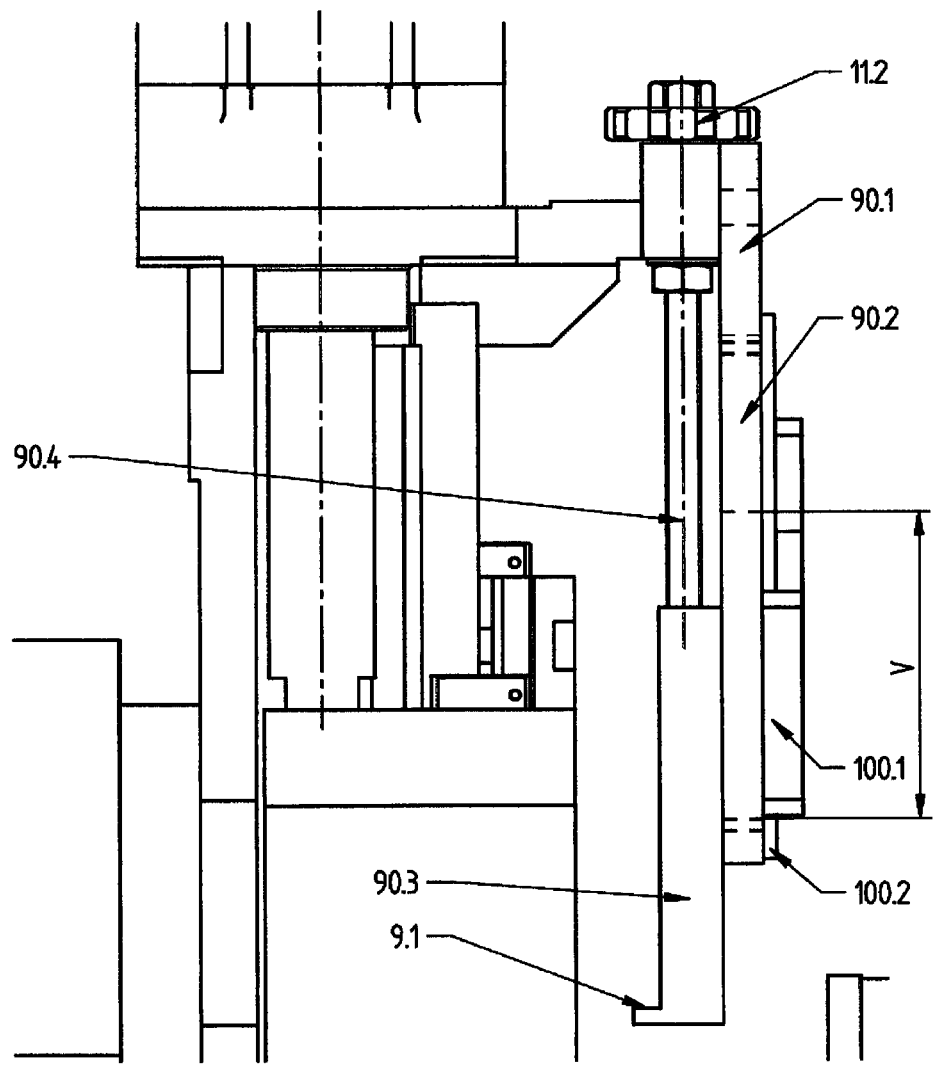
FIG. 5 is an enlarged detail from FIG. 4.

During adjustment (pivoting) of the adjustment levers 7.1 or 7.2, the stop bolt 9.2 (not shown in FIGS. 4 and 5) which is rigidly screwed to the adjustment lever 7.1, strikes this stop face. FIG. 5 shows a manual adjustment via a hand wheel 11.2.

Figure 6:
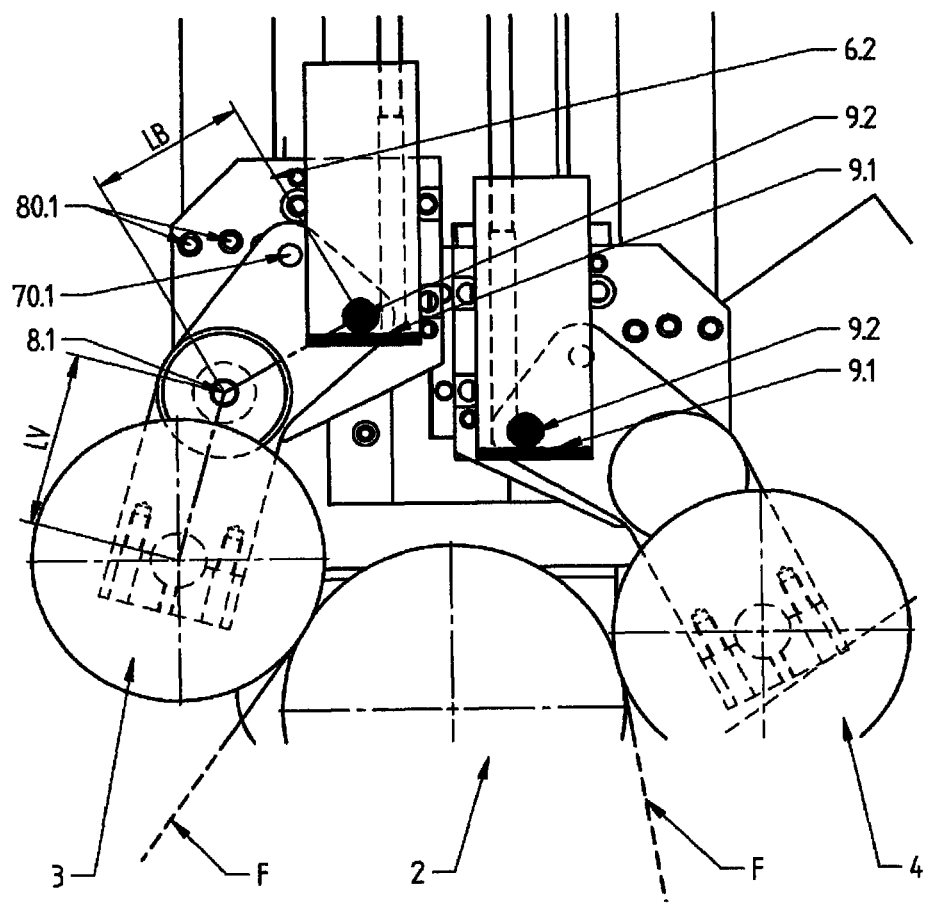
FIG. 6 is a further enlarged detail similar to FIG. 3.

FIG. 6 shows the adjustment lever 7.1 together with the stop bolt 9.2 when the holding plate 90.1 has been removed and the adjustment unit fully dismantled, so as to illustrate the lever ratios. Merely the "virtual" stop face 9.1 is also shown for clarity.

In particular cases, the adjustment lever 7.1 or 7.2 can also be fixed, by rigidly screwing the relevant adjustment lever 7.1 or 7.2 via the holes 70.1 to holes 60.1 provided there.

Figure 7:
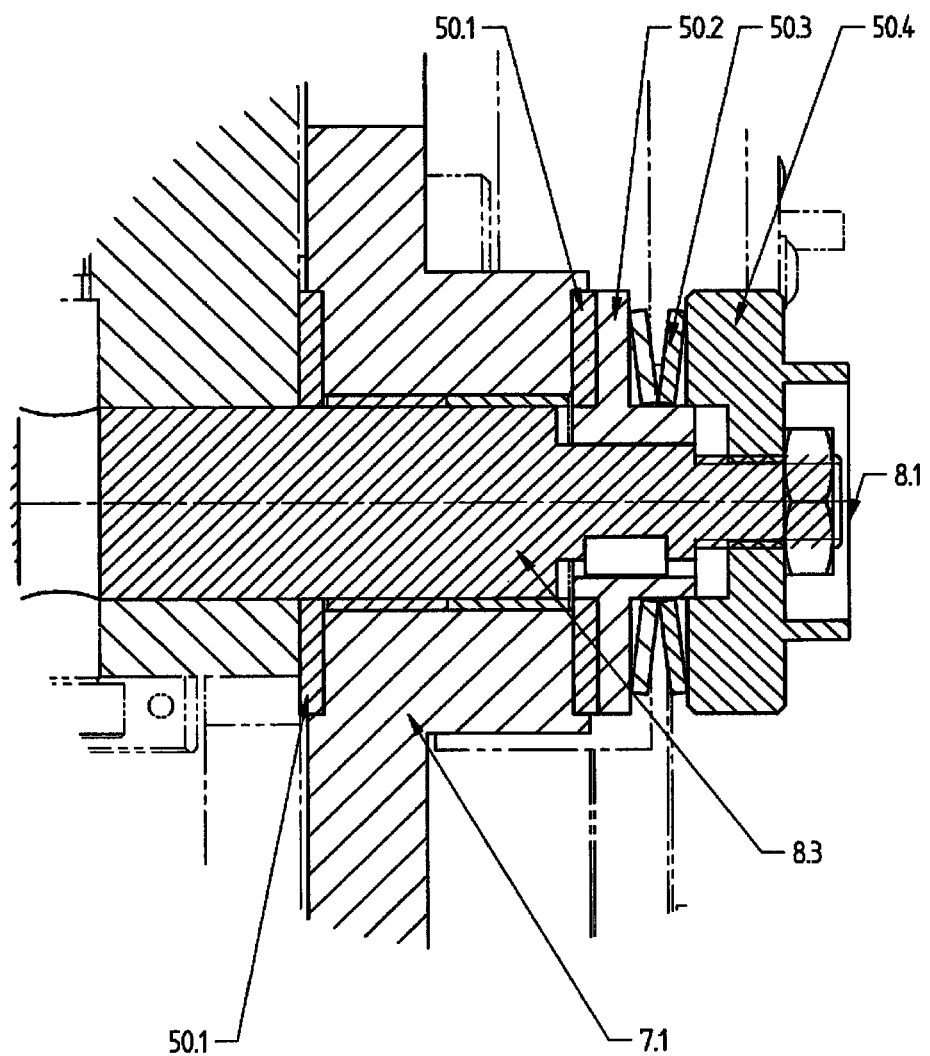
FIG. 7 is an enlarged axial section through the end of a pressure roller, showing a braking and friction means for preventing the pressure roller from pivoting under gravity.

If the pressure roller 3, 4 is raised from the process roller 2 by way of the adjustment means VE, the pressure roller would be in contact for longer as a result of gravity, and this is undesirable for the process. Therefore, the rotation about the bearing axle 8.1 is suppressed by a braking mechanism. FIG. 7 is a section through the lever axle 8.1, on which the adjustment lever 7.1 rotates. The two brake discs 50.1 are located in a recess which is attached to the rotation axle by way of a centring disc 50.2. By way of a plate spring 50.3 and a pressure plate 50.4, the friction can be adjusted in such a way that the relevant adjustment lever 7.1 or 7.2 remains stationary in the last position thereof. The two brake discs 50.1 are arranged mutually axially offset, specifically in the axial direction of the associated pivot axles 8.1 and 8.2. In this case, the brake discs 50.1 are supported in the form of perforated discs on a corresponding axle bolt 8.3 which forms the respective pivot axle 8.1 or 8.2. Thus, the two brake discs 50.1 are force-loaded towards one another in the axial direction, specifically receiving a corresponding portion of the adjustment lever 7.1 (or 7.2) therebetween in a sandwiched manner.

The following figures, FIGS. 8.1 to 8.4, show different examples, each in an axial sectional view, of a process roller 2 which can be brought into contact with a pressure roller 3 on the entry side of the process roller. In other words, the roller surface 3' of the pressure roller 3 and the roller surface 2' of the process roller 2 touch one another along a contact line located parallel to the axial centre line of the rollers, the roller lateral surfaces 2' and 3' not being directly in contact because, as shown, the material web or for example the plastics material film F is of course guided through between the two roller lateral surfaces 2' and 3'. The pressure roller 3 is adjusted by means of the aforementioned adjustment means VE, which comprises a displacement unit VF, which can displace the pressure roller between an operating position and a parked position (and which, in the embodiment shown, consists of a displacement unit VF which makes translational adjustment possible), and in addition comprises an angle adjustment means WE for the relevant pressure or nip roller 3. By way of the aforementioned force activation unit 10, the corresponding contact pressures can be generated and adjusted. In other words, the pressure roller 3 is thus pressed against the roller surface 2' (in other words the lateral surface or the surface of the process roller 2) by way of the aforementioned holding and adjustment means by way of the force activation unit 10 along a contact line that is parallel to the roller rotation axle, the material web F being guided through between the two rollers along the arrow 37, between the roller surface or the lateral surface or surface of the pressure roller 3, and the roller surface or the lateral surface or surface of the process roller 2, and guided around the process roller in a partial wrapping angle.

In FIG. 8.1, the pressure roller 3 is shown in the working or operating position thereof, in which a straight line G passing through the axial centre line of the pressure roller 3 and the process roller 2 takes on an angle $\varphi 1$ to a plane H. This plane H is ultimately orientated perpendicularly to the feed direction ZR of the displacement unit VF, which thus extends through the slide arrangement through the adjustment means by means of the force actuation means. A stop height h1 is further adjusted, which is defined by the distance between the axial centre line 2.5 of the process roller 2 and the position of the stop or the stop face 9.1, in other words in a direction parallel to the feed direction ZR, in which the angle adjustment means WE, in other words the pivot arms 8 (thus in this case the pivot axle 8.1 in relation to the pressure roller 3) which pivotably hold the lever arms 7.1 (and if applicable 7.2), are adjusted by the force application means. If, by way of the pneumatic cylinder, the entire adjustment unit VE is displaced in the direction of the process roller in the feed direction ZR, pivoting is possible, clockwise in the drawing shown, after the lateral surface or surface 3' of the pressure roller 3 touches the material web F in the region in which the material web F is in contact with the lateral surface or surface 2' of the process roller 2, specifically until stop bolt 9.2 fixed to the pivot lever 7.1 strikes the stop face 9.1. Further clockwise pivoting is subsequently not possible, and therefore the contact pressures can ultimately be defined by correspondingly adjusting the pneumatic cylinder (in other words the force activation unit 10).

FIG. 8.2 shows the pressure roller 3 in the parked position thereof, in which the pressure roller 3, including the pivot axle 8.1 and the stop bolt 9.2, is raised, the stop bolt 9.2 moving away from the stop face 9.1. In other words, the pre-set distance, in other words the stop height h1, remains unchanged between the centre point, in other words the axial centre line 2.5 through the pressure roller 2, and in the stop or the stop face 9.1.

FIG. 8.2 also shows the feed direction ZR along which the translationally acting adjustment part (in other words the displacement unit VF) of the adjustment means VE as a whole, and thus the pressure roller 4, are displaced when the force activation unit 10 is activated. In this case, the pressure roller 3 can be displaced out of its parked position according to FIG. 8.2 along the feed direction ZR until the lateral surfaces of the pressure roller and process roller generate the appropriate contact pressures when the material web F is guided through. The angle adjustment means WE can only be effective and guide a clockwise adjustment until the aforementioned stop 9.2 strikes the stop or stop face 9.1.

At this point, it is further noted that the force application direction FR extends as in the enlarged detail of FIG. 9, in other words, in the drawing or section plane shown, perpendicularly to the axial lines 2.5 and 3.5 of the rollers, in such a way that the force application direction FR intersects the axial centre line 3.5 of the pressure roller 3, the contact line KL between the roller lateral surfaces of the two cooperating rollers 2 and 3, and the axial centre line 2.5 of the process roller 2.

It is further noted that, in FIG. 8.1 to FIG. 8.4, only one of the possible overall orientations of the force actuation means 10, including the linear adjustment slides 6.2 for the displacement means VE, is shown. This is because the plane H extending through the axial centre line 2.5 of the process roller 2 is ultimately, by definition, merely perpendicular to the feed direction ZR, in which the adjustment axle 8 of the angle adjustment means WE is adjusted towards or away from the process roller 2 by the force activation means 10. In other words, the plane H generally deviates from a horizontal plane.

This is ultimately also shown in FIG. 10, which basically differs from FIGS. 8.1 to 8.4 only in that the entire arrangement is orientated in a different angular position from FIGS. 8.1 to 8.4. From this, it can be seen that the plane H still extends perpendicularly to the feed direction ZR of the force activation means in this variant too, but at an angle to a horizontal plane HE. The angle φ1 and the force actuation means FR, by which the pressure roller 3 is pressed against the material web F extending around the process roller 2 at a wrapping angle, are shown in this case too.

From FIG. 10, the distance h1 can likewise again be seen, in other words the effective distance h1 which corresponds to the distance between the stop or the stop face 9.1 and the plane H which is orientated perpendicularly to the feed direction ZR of the force actuation means.

The variant of FIG. 10 shows that the entire arrangement can be installed and mounted in a corresponding system in any possible orientation and rotational position.

The angle φ1 represents the angle between the force application direction FR of the pressure roller 3 in the direction of the surface 2' of the process roller 2, and the plane H extending perpendicularly to the feed direction ZR. This angle may be of any size, for example between 0° and 90° or even over 90°, specifically if the pressure roller 4 is in contact on the other side of the process roller 2 by comparison with FIGS. 8.1 and 8.3 or FIG. 10, specifically in a region in which the material web F is still being guided in contact with the roller surface of the process roller.

In other words, the feed direction ZR can be positioned in wide ranges of φ1=0° to well over 90° at a suitable angle about the axial centre point 2.5 of the process roller 2.

If for example in the embodiments of FIG. 8.1, 8.3 or 10 the angle φ1 is 0°, in the context of the invention a force could still be exerted on the process roller 2 by way of the pressure roller 3, specifically by the angular adjustment means WE in the form of the pivot lever 7 shown in the drawings along with the associated pivot lever arms 7.1a and 7.1b thereof, which are of a length LV and LB, respectively. In this case, the contact pressure is adjustable by way of the feed force, in such a way that no slip can occur between the pressure roller and the process roller.

This could not be achieved in this way in a conventional solution, in which for example a pressure roller 4 would be held pressed onto the process roller without the use of the deflection lever 7.1 provided in the context of the invention. This is because the contact pressure between the pressure roller and the process roller would then only depend on the actual distance between the axial centre lines of the two rollers, this distance being the sum of the two radii of the two rollers 2 and 4. In practice, this would result in an oscillatable system having a resonant frequency, with the result that slip between the pressure roller and the process roller would still occur.

It can thus also be seen from the description that, in the context of the invention, the feed direction ZR can be orientated in such a way that a different angle (=90°−φ1) can be set between the feed direction ZR and the force application direction FR.

It can also be seen, for example from FIGS. 8.1 and 8.2, that the feed vector (feed direction) extending through the axial centre line 3.5 of the pressure or nip roller 3 extends past the axial centre line 2.5 of the process roller 2 in the direction of the process roller 2 perpendicularly to the plane H at a lateral distance SA (FIG. 9). In this case, it is found to be favourable if this lateral distance SA has values which are at least 10%, preferably at least 20%, 30%, 40%, 50%, 60%, 70%, 80%, 90% or 100% of the radius $R_p$ of the process roller 2. In this case, the lateral distance SA can even take on even larger values, specifically at least 110%, 120%, 130% or for example even 140% of the value of the radius of the process roller 2. In other words, in the latter cases, the vector of the feed direction ZR extends fully past the process roller 2, and thus does not intersect the process roller 2, as can be seen in particular from FIG. 9.

The angle between the feed direction ZR and the force application direction FR can preferably be dimensioned in such way that the angle between the feed direction ZR and the force application direction FR between two rollers 3, 4; 2 in operation is greater than 5°, in particular greater than 10°, 15°, 20°, 25°, 30°, 35°, 40° and in particular less than 80°, 70°, 60°, 55°, 50°, 45° or 40°.

FIGS. 8.3 and 8.4 are views corresponding to FIGS. 8.1 and 8.2, but with a differently, i.e. varyingly, adjusted stop height h2, which is less than the stop height h1 shown in FIGS. 7.1 and 7.2.

The different, smaller stop height h2, which can be adjusted as described by adjusting the stop face 9.1 towards the pressure roller 2, results in a correspondingly defined different end position of the pressure roller, since in this case the associated pivot lever 7.1 can be adjusted further clockwise until the stop bolt 9.2 strikes the stop or the stop face 9.1 and prevents further pivoting. This also results in a lower contact line between the surface of the pressure roller and the surface of the process roller, and thus results in a different pressure line on the material web F moved through between the two rollers.

Finally, FIG. 8.4 is a view corresponding to FIG. 8.2 in which the pressure roller 3 is displaced into the park position thereof at the specified stop height h2.

However, these drawings also show that, in particular when the pressure roller is displaced into the park position thereof, completely unproblematic threading in of the material web F is possible, since the entire adjustment means, including the associated pivot axles, adjustment levers, force activation units etc., is arranged offset from the body of the process roller 2.

According to the drawings shown, the mode of operation relates to an additionally or alternatively provided exit-side pressure or nip roller 4.

The embodiment shown has been described in such a way that, ultimately, the application or contact line KL, along which the pressure roller 3 touches the surface of the roller surface of the process roller 2 (or the film F moved along thereon), can be adjusted by changing the position of the stop 9.1. This can occur in a motorise manner or else, as described, by way of a spindle. By way of the feed movement ZR by way of the force application means 10, after the stop 9.2 has reached a stop face 9.1, the pressure roller 3 is increasingly pivoted towards and pressed against the process roller 3, anti-clockwise in the views in FIGS. 8.1 and 8.3. In principle, a kinematic deflection would also be possible, such that ultimately, by way of an adjustment means, a particular position of the pivot axle 8 is adjusted for the pivot lever 7 having the two pivot levers 7.1*a* and 7.1*b*, and that subsequently, for example by way of a motor unit, the stop face 9.1 is adjusted away from the process roller counter to the feed direction shown in the drawings (but in the same orientation parallel thereto), until, after running up against the stop 9.2, the pressure roller 3 is increasingly pivoted towards the process roller 2, and the force application of the pressure roller on the surface of the process roller can thus be adjusted effectively.

In the embodiment described thus far, the pivot axle 8 of the adjustment lever 7 is merely adjusted linearly in accordance with the feed direction or in the opposite direction when the force activation means is activated. If the pivot lever were adjusted to a different angular position, when the stop 9.2 ran up against the stop face 9.1 the stop 9.2 would be displaced somewhat in parallel with respect to the stop face 9.1, specifically depending on the different orientation of the corresponding lever arm 7.1*b* carrying the stop bolt 9.2.

The described embodiments are constructed in such a way that the stop 9.2 strikes the stop face 9.1 in a stop-limited manner on just one side. This makes it possible to displace the pressure roller and the associated pivot lever linearly (in other words in a straight line) away from the process roller counter to the feed direction or to displace them towards the process roller, without angle adjustment by way of the force activation means. However, the stop 9.2 could also be held in a stop-limited manner in the two opposing directions, in such a way that when the force activation means becomes effective in the feed direction ZR (or in the direction counter thereto) the pressure roller 3 would always be forced, by the linear adjustment of the pivot axis 8 carrying it, to also carry out an angle rotational movement.

The described adjustable-angle pressure roller can thus be used in all processes and in all fields where corresponding pressure or nip rollers having corresponding process rollers are to be pressure-loaded whilst also guiding through a material web F. Adjustable pressure or nip rollers of this type can thus be used in particular in the field of film manufacture, in other words in the field of film stretching systems, but also for example in the field of manufacturing and processing metal webs, paper webs, plastics materials in general etc. In this case, the pressure rollers are generally formed over the entire operating width AB of the material web to be processed, and thus generally have an axial length comparable to the axial length of the associated process roller. By contrast, nip rollers are formed so as to be shorter in axial extent than the operating width AB of the material web. Therefore, nip rollers are usually positioned and used on the edges of the material web or product web, so as to cooperate there with a corresponding process roller whilst the material web is guided through.

The described measures also apply in principle to a pressure roller 4 which is arranged on the exit side, in other words on the side of the withdrawal direction of the material web F, on the process roller, as can be seen in principle from the first embodiments of FIGS. 1 to 3.

The described effects and advantages and some of the preferred features can thus be summarised as follows:

By changing the position of the stop face or generally the stop 9.1, a simple adjustment of the contact position of the pressure or nip roller is possible even during operation on the lateral surface of a process roller cooperating therewith whilst guiding a material web between the two rollers. For some processes, it is highly advantageous, and in some cases even necessary, to actually optimise these positions continuously.

By way of the solution according to the invention, the contact pressure can also be changed, likewise including during operation and use of the pressure or nip roller.

It is also advantageous that the direction of the force introduction of the pressure roller in the direction of the process roller is or can be different from the movement direction in which the pressure roller is moved onto the lateral surface or surface of the process roller cooperating therewith. The direction of the force introduction is different from the movement direction of the pressure roller.

Depending on the arrangement and requirements, these pressure or nip rollers should and can perform the following functions:

a) The film should be prevented from being screwed up, in such a way that no air cushion (air bubbles) can occur and are present between the film and the process roller.

b) By pressing the process roller in the direction of the process roller, the material web being moved through therebetween should be raised to increase the withdrawal and/or stretching forces to be transmitted.

c) Material retraction, in particular film retraction, on the process roller should be prevented, preferably in the region of an exit-side process roller.

d) As a result of the precise adjustment of the application line or contact line KL, microscratches on films or film coatings can be greatly reduced by comparison with conventional solutions.

e) Further, the control mechanism can be equipped independently of the mechanism of the process roller.

f) In this case, it is also found to be very positive that the position of the pressure roller in relation to the process roller can even be adjusted during the production process, in other words whilst the material web F is being guided through between the pressure roller and the process roller.

g) Further, threading in the material web and product web is greatly facilitated by comparison with conventional solutions by the specific configuration of the adjustment means according to the invention.

The invention claimed is:

1. Adjustable-angle pressure or nip roller comprising an associated process roller, wherein:
   an adjustment mechanism is configured to adjust via a force activation unit the pressure or nip roller between a parked position in which a roller surface of the pressure or nip roller is a distance from a roller surface of the process roller and an operating position in which the roller surface of the pressure or nip roller is pressed onto the roller surface of the process roller, a material web being guided through between the roller surface of the pressure or nip roller and the roller surface of the process roller,
   the adjustment mechanism is configured to displace the pressure or nip roller in a feed direction with respect to the process roller,
   the adjustment mechanism comprises a lever that is configured to angularly adjust a position of the pressure or nip roller with respect to the process roller, the lever comprising a two-armed lever that is pivotable about a pivot axis and comprising two adjustment lever arms,
   the pressure or nip roller is rotatably mounted on one adjustment lever arm, and a stopper is provided on the other adjustment lever arm, the adjustment mechanism is configured to adjust the pivot axis of the two-armed lever with respect to the process roller, and the lever comprises a stop or a stop face which cooperates with the stopper provided on the other adjustment lever arm in such that, when force is applied to the pressure or nip roller by the force activation unit, a contact force acting on the pivot axis of the two-armed lever can be generated, such that the pressure or nip roller can be pressure-loaded in a force application direction onto the roller surface of the process roller whilst the material web is guided through between the pressure or nip roller and the process roller.

2. Adjustable-angle pressure or nip roller according to claim 1, wherein the feed direction is orientated at an angle to a force applied to the pressure or nip roller onto the process roller in the operating position.

3. Adjustable-angle pressure or nip roller according to claim 1, wherein the adjustment mechanism is radially offset from the process roller in an end view of said process roller for adjusting the pressure or nip roller with respect to the process roller.

4. Adjustable-angle pressure or nip roller according to claim 1, wherein a feed movement of the pressure or nip roller in a direction of the process roller, extending through an axial center line of the pressure or nip roller, passes an axial center line of the process roller at a lateral distance, the lateral distance being at least 10% of the of a radius of the process roller.

5. Adjustable-angle pressure or nip roller according to claim 1, wherein the adjustment mechanism comprises a translational displacement mechanism and a stop-limited angle adjustment mechanism, such that the translational displacement mechanism and the stop-limited angle adjustment mechanism are configured to move the pressure or nip roller from the parked position into the operating position.

6. Adjustable-angle pressure or nip roller according to claim 5, wherein the stop-limited angle adjustment mechanism comprises the stop or the stop face which cooperates with the stopper on the other adjustment lever arm, thus limiting a maximum pivoting of the pressure or nip roller away from the process roller.

7. Adjustable-angle pressure or nip roller according to claim 6, wherein the stop or the stop face of the stop-limited angle adjustment mechanism is adjustable.

8. Adjustable-angle pressure or nip roller according to claim 6, wherein the stop or the stop face of the stop-limited angle adjustment mechanism is adjustable manually or in a motorized manner.

9. Adjustable-angle pressure or nip roller according to claim 1, wherein the adjustment mechanism is adjustable during operation of the rollers.

10. Adjustable-angle pressure or nip roller according to claim 1, wherein the two-armed lever is pivotably held on the adjustment mechanism by the pivot axis, the pivot axis being displaceable in the feed direction by the adjustment mechanism.

11. Adjustable-angle pressure or nip roller according to claim 6, wherein the stopper on the other adjustment lever arm comprises a stop bolt that is configured be pivoted together with the other adjustment lever arm and that is configured to interact with the stop or the stop face.

12. Adjustable-angle pressure or nip roller according to claim 11, wherein, in the operating position, when the pressure or nip roller is in a pressure-loaded contact position on the process roller, the stop bolt rigidly attached to or formed on the other adjustment lever arm strikes against the stop or the stop face.

13. Adjustable-angle pressure or nip roller according to claim 11, wherein the pressure or nip roller arranged on an entry or input side with respect to the process roller is mounted on and attached to the lever in such a way that the pressure or nip roller is pivotable together with the lever, in a rotational direction of the process roller, until a stop-limited end position is reached in which the stop bolt strikes against the stop or the stop face.

14. Adjustable-angle pressure or nip roller according to claim 11, wherein the pressure or nip roller arranged on an output or exit side with respect to the process roller is mounted on and attached to the lever in such a way that the pressure or nip roller is pivotable, together with the lever, counter to a rotational direction of the process roller, until a stop-limited end position is reached in which the stop bolt strikes against the stop or the stop face.

15. Adjustable-angle pressure or nip roller according to claim 11, wherein a position of the stop or the stop face is configured to be pre-set such that, in a pre-set positioning of the stop or stop face, the pressure or nip roller can be raised from or fed towards the process roller by the force activation unit.

16. Adjustable-angle pressure or nip roller according to claim 1, wherein the pressure or nip roller is held against pivoting under gravity by a brake and/or a frictioner, when the pressure or nip roller is located in the parked position or traveling to the parked position.

17. Adjustable-angle pressure or nip roller according to claim 16, wherein the brake and/or frictioner comprises an axially acting spring, a plate spring, or a pressure plate, such that a braking or friction effect can be adjusted.

18. Adjustable-angle pressure or nip roller according to claim 16, wherein the pressure or nip roller is configured to be pivoted until a stop-limited end position is reached by overcoming braking or frictional forces produced by the brake and/or frictioner, when the pressure or nip roller is placed on the process roller.

19. Adjustable-angle pressure or nip roller according to claim 1, wherein an angle between the force application direction and a plane extending perpendicularly to the feed direction is 0° or greater than 0°.

20. Adjustable-angle pressure or nip roller according to claim 1, wherein an angle between the force application direction and a plane extending perpendicularly to the feed direction is less than 150°.

21. Adjustable-angle pressure or nip roller according to claim 6, wherein the stop-limited angle adjustment mechanism comprises a second stop or a second stop face, such that the other adjustment lever arm is configured to be held in a stop-limited manner in two opposing directions while being pivotable relative to the stop-limited angle adjustment mechanism.

* * * * *